US012765707B2

(12) United States Patent
Rossetto et al.

(10) Patent No.: US 12,765,707 B2
(45) Date of Patent: Oct. 20, 2026

(54) TOOL FOR ADJUSTING THE AMOUNT OF POWDERED MATERIAL

(71) Applicant: DE' LONGHI APPLIANCES S.r.l., Treviso (IT)

(72) Inventors: Giovanni Rossetto, Treviso (IT); Maurizio Casasola, Treviso (IT)

(73) Assignee: DE' LONGHI APPLIANCES S.r.l., Treviso (IT)

( * ) Notice: Subject to any disclaimer, the term of this patent is extended or adjusted under 35 U.S.C. 154(b) by 588 days.

(21) Appl. No.: 18/029,848

(22) PCT Filed: Dec. 9, 2021

(86) PCT No.: PCT/EP2021/084920
§ 371 (c)(1),
(2) Date: Mar. 31, 2023

(87) PCT Pub. No.: WO2022/144155
PCT Pub. Date: Jul. 7, 2022

(65) Prior Publication Data

US 2023/0329474 A1 Oct. 19, 2023

(30) Foreign Application Priority Data

Dec. 29, 2020 (IT) ........................ 102020000032684

(51) Int. Cl.

| | |
|---|---|
| ***A47J 31/06*** | (2006.01) |
| ***A47J 31/44*** | (2006.01) |
| ***B26D 7/06*** | (2006.01) |

(52) U.S. Cl.
CPC ....... *A47J 31/0663* (2013.01); *A47J 31/4403* (2013.01); *B26D 7/06* (2013.01)

(58) Field of Classification Search
CPC .... A47J 31/0663; A47J 31/4403; A47J 42/56; A47J 42/50; A47J 31/52; A47J 31/3614;
(Continued)

(56) References Cited

U.S. PATENT DOCUMENTS

2018/0360255 A1* 12/2018 Ye ...................... B65D 85/8043
2019/0183282 A1* 6/2019 Morin .................. A47J 31/404

FOREIGN PATENT DOCUMENTS

WO 2008/067590 A1 6/2008
WO 2015/131239 A1 9/2015
(Continued)

OTHER PUBLICATIONS

International Search Report dated Mar. 17, 2022, from corresponding application No. PCT/EP2021/084920.

*Primary Examiner* — Phuong T Nguyen
(74) *Attorney, Agent, or Firm* — Troutman Pepper Locke LLP

(57) ABSTRACT

A tool for adjusting the amount of powdered material contained in a vessel, comprising a storage reservoir of an excess of powdered material contained in the vessel, a lower wall configured to be positioned inside the vessel, a side wall configured to rotatably support the tool resting on a peripheral edge of the vessel and to position the lower wall at a fixed or adjustable predetermined height inside the vessel, where the lower wall has at least a first blade configured to pick up the excess of powdered material and at least one transfer passage for transferring at least most of the excess of powdered material picked up from the first blade towards the storage reservoir.

13 Claims, 3 Drawing Sheets

(58) Field of Classification Search
CPC .. A47J 31/525; A47J 31/0668; A47J 31/3671; A47J 31/3676; A47J 31/4464
USPC .................. 99/286, 279, 280, 283, 295, 300
See application file for complete search history.

(56) References Cited

FOREIGN PATENT DOCUMENTS

| | | | |
|---|---|---|---|
| WO | 2018/127676 | A1 | 7/2018 |
| WO | 2019/078549 | A1 | 4/2019 |

* cited by examiner

TOOL FOR ADJUSTING THE AMOUNT OF POWDERED MATERIAL

CROSS-REFERENCE TO RELATED APPLICATIONS

The present application is a U.S. national phase application under 35 U.S.C. § 371 of International Patent Application No. PCT/EP2021/084920, filed Dec. 9, 2021, which claims priority to Italian Patent Application No. 102020000032684, filed Dec. 29, 2020. The entire contents of which are hereby incorporated by reference.

FIELD OF THE INVENTION

The present invention relates to a tool for adjusting the amount of powdered material contained in a vessel.

BACKGROUND

Tools for adjusting the amount of powdered materials in a vessel, typically coffee powder in a filter of a coffee brewing machine, have been on the market for some time.

It is known that in a manual coffee machine, with or without an integrated coffee grinder, the proper amount of coffee powder inside the filter ensures the amount and quality of coffee dispensed.

To properly fill the filter, a spoon or, if present, an integrated grinder can be used. After the filling process, the coffee powder must first be compacted and then the preparation by brewing process can be performed.

An excessive amount of coffee powder inside the filter after the pressing process causes the coffee machine to malfunction and the coffee would be dispensed with difficulty.

Manual tools are known and present on the market for removing excessive amounts of coffee powder in the filter: some tools have been developed for both professional and domestic coffee machines in order to ensure the uniform distribution of coffee powder inside the filter before the pressing process.

None of these tools known today ensures the proper amount inside the filter, obtainable only with the adjustment of the grinder in the case of a coffee machine with integrated grinder.

A similar concept has been developed for a domestic coffee machine: WO2008/067590 A1 illustrates a tool for controlling the amount of a particulate contained in a vessel.

Such tools are notoriously ineffective, as even this tool is not able to retain the excess coffee powder.

There is therefore a need to simplify the structure of the known tools for adjusting the amount of powdered material contained in a vessel.

SUMMARY

The technical task which is proposed for the present invention is, therefore, to create a tool for adjusting the amount of powdered material contained in a vessel which makes it possible to eliminate the technical drawbacks complained of in the prior art.

As part of this technical task, an object of the invention is to create a tool for adjusting the amount of powdered material contained in a vessel which is capable of removing the excess coffee powder.

Another object of the invention is to create a tool for adjusting the amount of powdered material contained in a vessel which is capable of retaining the excess coffee powder.

Not least, an object of the invention is to create a tool for adjusting the amount of powdered material contained in a vessel which is simple and effective.

The technical task, as well as these and other objects, according to the present invention are reached by creating a tool for adjusting the amount of powdered material contained in a vessel, characterized in that it comprises a storage reservoir of an excess of powdered material contained in said vessel, a lower wall configured to be positioned inside said vessel, a side wall configured to rotatably support the tool resting on a peripheral edge of said vessel and to position said lower wall at a fixed or adjustable predetermined height inside said vessel, said lower wall having at least a first blade configured to pick up said excess of powdered material and at least one transfer passage for transferring at least most of said excess of powdered material picked up from said first blade towards said storage reservoir.

In one embodiment, the lower wall is circular and is configured to match with a cylindrical peripheral wall of the vessel.

In one embodiment the transfer passage is delimited by the cutting edge of the first blade. In one embodiment the first blade extends radially.

In one embodiment, the storage reservoir, the lower wall, the side wall having the first blade and the transfer passage are made as a single hollow body.

In one embodiment, the tool for adjusting the amount of powdered material contained in a vessel has a second blade movable with respect to the first blade and configured to transfer to the storage reservoir any residual part of the excess of powdered material picked up from the first blade which has not been transferred to the storage reservoir.

In one embodiment the second blade is movable from and towards the first blade. In one embodiment, the second blade is configured to open and close the transfer passage. In one embodiment, the second blade is rotatable with respect to the first blade around a central vertical axis of the tool.

Other features of the present invention are further defined in the following claims.

BRIEF DESCRIPTION OF THE DRAWINGS

Further characteristics and advantages of the invention will more fully emerge from the description of a preferred but not exclusive embodiment of the tool for adjusting the amount of powdered material contained in a vessel according to the invention, illustrated by way of non-limiting indication in the accompanying drawings, in which.

DETAILED DESCRIPTION

Figure 1:
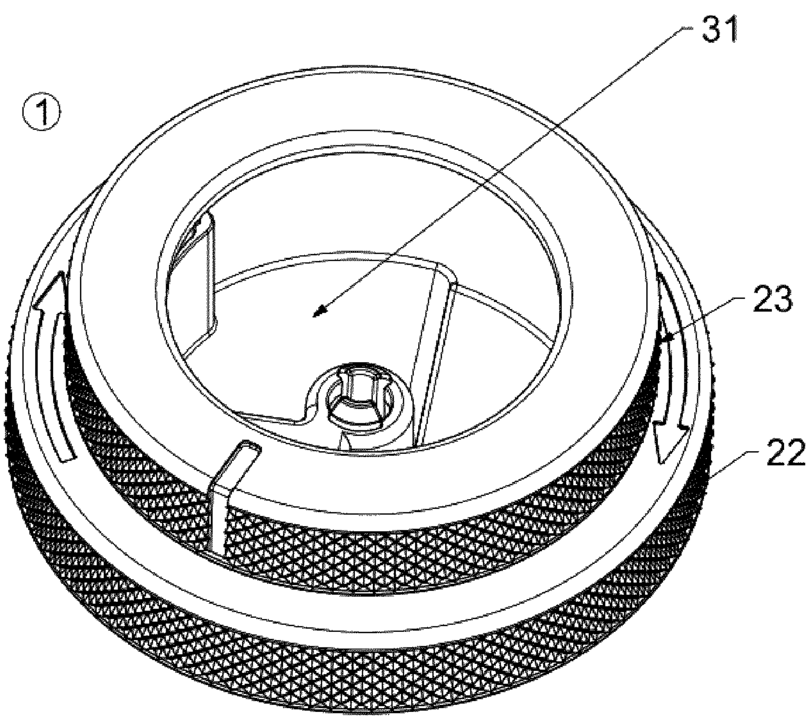
FIG. 1 shows a top view of the tool m the excess powder removal configuration.
Figure 2:
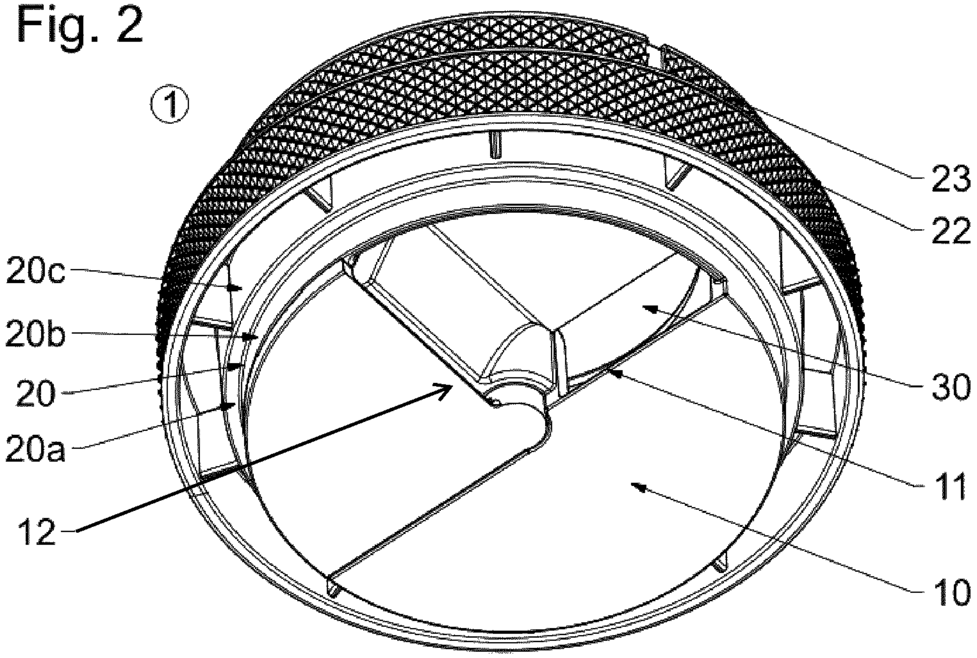
FIG. 2 shows a bottom view of the tool in the excess powder removal configuration.
Figure 3:
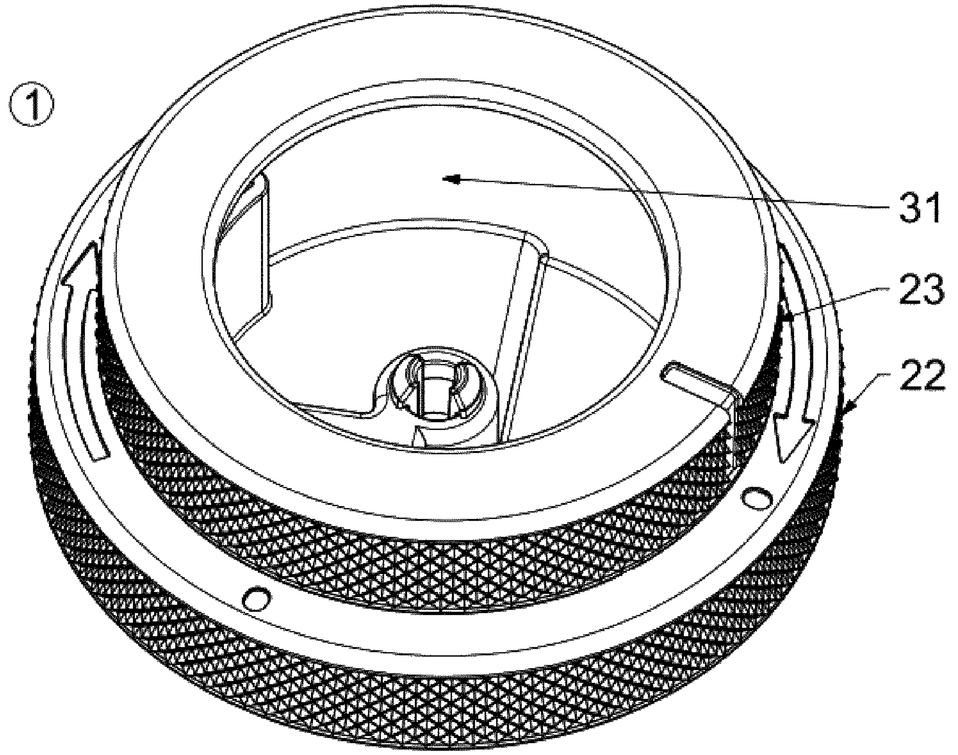
FIG. 3 shows a top view of the tool m the excess powder retention configuration.
Figure 4:
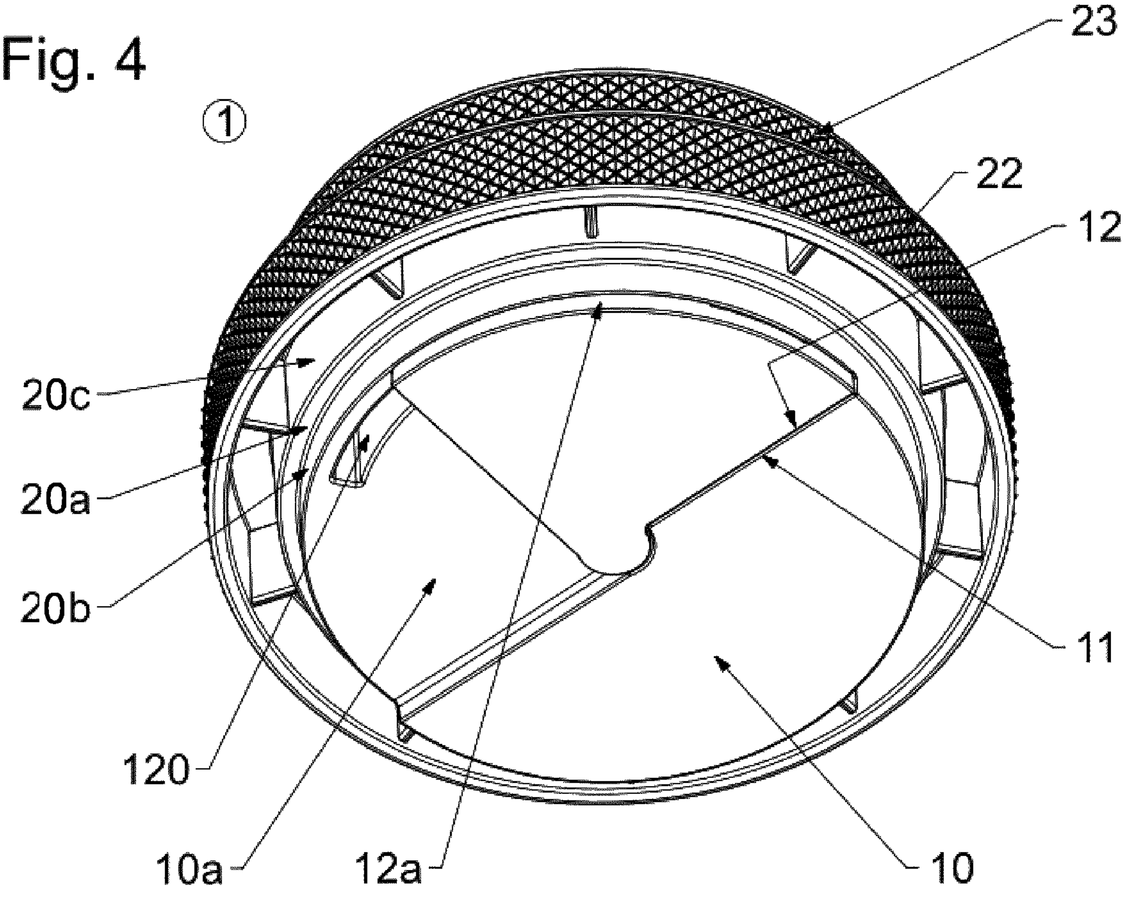
FIG. 4 shows a bottom view of the tool in the excess powder retention configuration.
Figure 6:
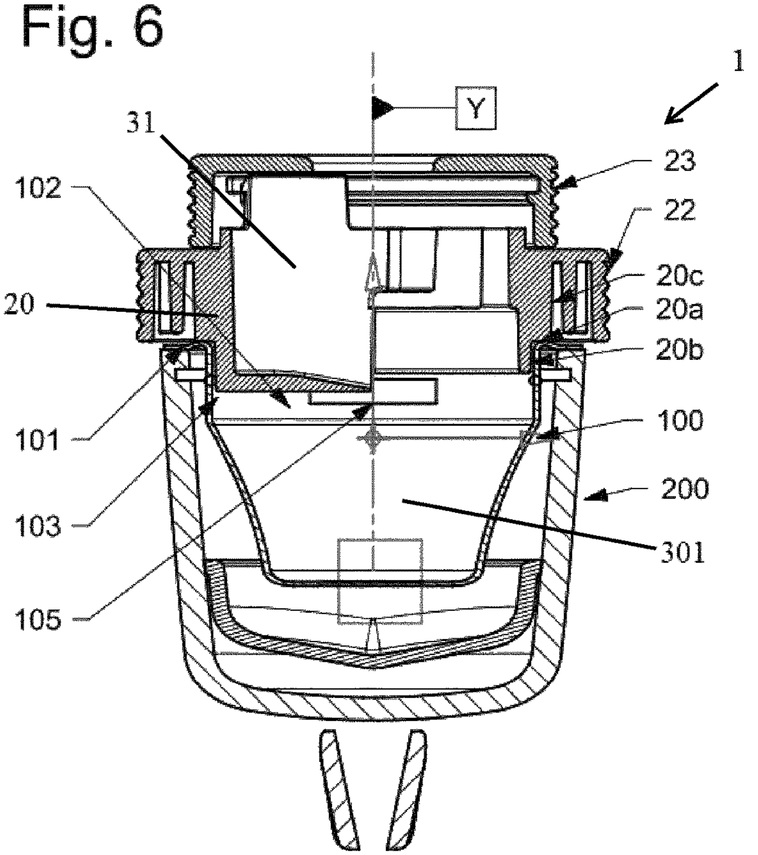
FIG. 6 shows a section of the assembly of FIG. 5 according to the line A-A.
Figure 5:
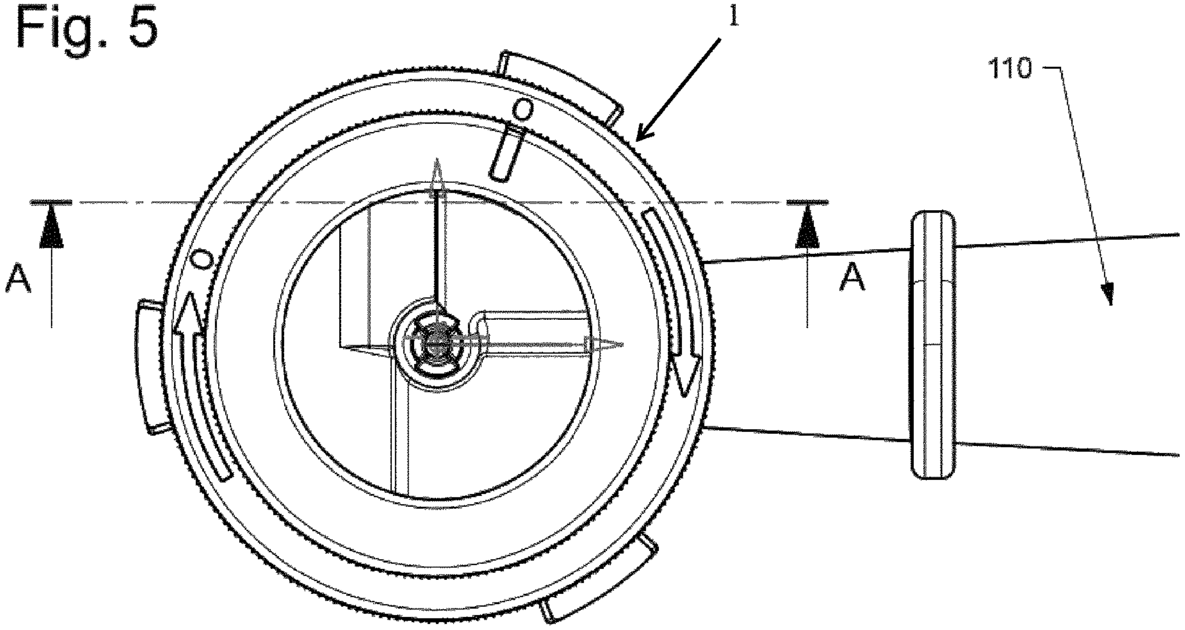
FIG. 5 shows a top plan view of the filter holder and filter assembly with the tool in the working position.

With reference to the aforesaid figures, a tool is shown for adjusting the amount of powdered material contained in a vessel, denoted in its entirety by the reference number 1.

Typically, the powdered material is coffee powder, the vessel is a filter housed in a filter holder engageable with the brewing head of a brewing unit mounted on a coffee machine (not shown).

In a known manner, the filter holder has a cup 200 where the filter 100 is housed and a handle 110 to be manipulated.

The tool 1 is of substantially conjugate shape with filter 100, typically circular with vertical axis Y coinciding with the coincident vertical axes of the filter 100 and cup 200 of the filter holder.

The tool 1 comprises a circular bottom wall 10 configured to be positioned inside the filter 100 and configured to match with a cylindrical peripheral wall 103 of the filter 100.

The tool 1 comprises a side wall 20 configured to rotatably support the tool 1 resting on a peripheral edge 101, particularly of an upper mouth 102 of the filter 100 by means of a shoulder 20*a*.

The side wall 20 has a cylindrical lower portion 20*b* of smaller diameter, a cylindrical upper portion 20*c* of larger diameter and an annular portion connecting the cylindrical lower portion 20*b* and the cylindrical upper portion 20*c* defining the shoulder 20*a*.

The side wall 20 externally has a first ring nut 22 rigidly connected to the side wall 20 itself and of an outer diameter preferably greater than that of the cup 200 of the filter holder.

Suitably, when the tool 1 is resting on the peripheral edge 101 of the filter 100, the lower wall 10 is positioned at a predetermined height inside the filter 100, visually highlighted by one or more marks 105 on the inner surface of the filter 100.

The lower wall 10 has at least a first blade 11 extending radially and is configured to pick up the excess of powdered material, and at least one transfer passage 30 for transferring towards a storage reservoir 31 at least most of the excess of powdered material 301 picked up by the first blade 11.

Advantageously, in fact, the tool 1 comprises a storage reservoir 31 for the excess of powdered material, suitably configured inside a single hollow body defined at least by the lower wall 10 and the side wall 20.

The hollow body is typically open at the top.

In a preferred embodiment, the transfer passage 30 is defined as an opening of an angular sector—typically 90°—of the lower wall 10 without interruption and delimited by the cutting edge of the first blade 11.

According to an innovative feature of the present invention, the tool 1 has a second blade 12 movable with respect to the first blade 11 and configured to transfer towards the storage reservoir 31 any residual part of the excess of powdered material picked up from the first blade 11 which has not been transferred to the storage reservoir 31.

Said second blade 12 is movable from and towards the first blade 11, and is rotatable with respect to the first blade 11 around the vertical axis Y of symmetry of the tool 1.

The second blade 12 is configured to open and close the transfer passage 30: typically, in the preferred embodiment, the second blade 12 has a shape conjugate to the angular sector of the transfer passage 30.

The second blade 12 is arranged coplanar to the first blade 11.

To this end, the lower wall 10 of the tool 1 has a lowered area 10*a* which accommodates the second blade 12 when it assumes the opening position of the passage 30.

Suitable control, connection and rotation means constrain the second blade 12 to a second ring nut 23 positioned externally rotationally free to the side wall 20, above the first ring nut 22 and with a smaller outer diameter than this.

The operation of the tool for adjusting the amount of powdered material contained in a vessel according to the invention appears clear from the description and illustration and, in particular, is substantially as follows.

The filter 100 is removably positioned in a filter holder 200 with which a manual coffee machine is provided, with or without an integrated grinder thereof; the filter holder 200 allows and ensures the connection with the brewing section of the coffee machine.

An amount of coffee powder is dispensed from the coffee grinder into the filter 100 which is then pressed with a third means, not illustrated in the drawings.

After the pressing process, the user verifies the correct amount of pressed coffee powder inside the filter 100, comparing the level of the coffee with the marks 105 on the inner surface of the filter 100.

If the amount of coffee powder is higher than the marks 105 (the marks are not visible) the user uses the tool 1 to adjust the amount of powdered material to remove the excess amount.

The user introduces the tool 1 into the filter 10 with vertical movement and then implements a first rotation (typically clockwise) of the tool 1 through the first ring nut 22 around the vertical axis Y.

The first blade 11 and the second blade 12 rotate together; the position of the second blade 12 ensures the opening of the transfer passage 30.

The first blade 11 interferes with the coffee powder so as to pick up through the transfer passage 30 the excess of powdered material and to transfer towards the storage reservoir 31 at least most of the excess of powdered material picked up.

When in the vertical movement of the tool 1 the shoulder 20*a* of the side wall 20 abuts the peripheral edge 101 of the filter 100, the first blade 11 consequently reaches the height of the coffee powder in the filter 100 which has been envisaged and corrected for the optimal infusion of a coffee.

The user then implements a second rotation in the opposite direction to the previous one (typically counter-clockwise) of the second ring nut 23 which, through the control, connection and rotation means, rotates the second blade 12 around the vertical axis Y in a rotation direction opposite the previous one so that the second blade 12 closes the transfer passage 30, and in the movement drags and transfers any residual part of the excess of powdered material to the storage reservoir 30 which the first blade 11 has picked up but not transferred to the storage reservoir 30.

The angular excursion of the second blade 12 can be limited by special end-stroke means, for example a tooth 12*a* of the second blade 12 can be slidably engaged in an arcuate slot 120 closed at both the ends thereof obtained in the lower wall 10 of the tool 1.

Advantageously, the storage reservoir 30 being inside the hollow body, typically open at the top, the user can easily transfer the excess amount of coffee powder thus collected by removing the tool 1 from the filter 100 and transferring it to another vessel with a simple manual pouring.

It has been found in practice that a tool for adjusting the amount of powdered material contained in a vessel according to the invention is particularly advantageous to be able to remove the excess coffee powder.

A further advantage of a tool for adjusting the amount of powdered material contained in a vessel according to the invention is to be able to retain the excess coffee powder, and to be simple and effective.

A tool for adjusting the amount of powdered material contained in a vessel as conceived herein is susceptible to numerous modifications and variants, all falling within the scope of the inventive concept; further, all the details are replaceable by technically equivalent elements.

For example, the lower wall 10, in the illustrated solution, is positioned at a fixed predetermined height inside the vessel 100; however, it is also possible to position it at an adjustable predetermined height, for example by providing a telescopic structure of the tool through which the lower wall 10 can change the distance from the resting point of the tool on the vessel 100.

In practice, the materials used, as well as the dimensions, can be any according to the needs and the state of the art.

The invention claimed is:

1. A tool adjusting the amount of powdered material contained in a vessel, comprising:
- a storage reservoir of an excess of powdered material contained in said vessel,
- a lower wall configured to be positioned inside said vessel,
- a side wall configured to rotatably support said tool resting on a peripheral edge of said vessel and to position said lower wall at a fixed or adjustable predetermined height inside said vessel, wherein said lower wall comprising:
- at least a first blade configured to pick up said excess of powdered material;
- at least one transfer passage for transferring at least most of said excess of powdered material picked up from said first blade towards said storage reservoir; and
- a second blade movable with respect to said first blade and configured to transfer to said storage reservoir any residual part of said excess of powdered material picked up from said first blade which has not been transferred to said storage reservoir.

2. The tool adjusting the amount of powdered material according to claim 1, wherein said lower wall is circular and is configured to match with a cylindrical peripheral wall of said vessel.

3. The tool adjusting the amount of powdered material according to claim 1, wherein said transfer passage is delimited by the cutting edge of said first blade.

4. The tool adjusting the amount of powdered material according to claim 2, wherein said first blade extends radially.

5. The tool adjusting the amount of powdered material according to claim 1, wherein said storage reservoir is configured inside a single hollow body defined at least by said side wall and said lower wall having said first blade and said transfer passage.

6. The tool adjusting the amount of powdered material according to claim 1, wherein said second blade is movable from and towards said first blade.

7. The tool adjusting the amount of powdered material according to claim 1, wherein said second blade is configured to open and close said transfer passage.

8. The tool adjusting the amount of powdered material according to claim 1, wherein said first blade and said second blade are coplanar.

9. The tool adjusting the amount of powdered material according to claim 8, wherein said lower wall has a lowered zone configured to accommodate said second blade.

10. The tool adjusting the amount of powdered material according to claim 1, wherein said second blade is rotatable with respect to said first blade around a central vertical axis Y of said tool.

11. A filter holder with filter for a coffee machine, in combination with the tool according to claim 1 adjusting the amount of coffee powder contained in said filter.

12. A method for adjusting the amount of coffee powder contained in a filter housed in a filter holder connectable to an infusion unit of a coffee machine, comprising the following steps:
- dispensing an amount of coffee powder into the filter;
- pressing the coffee powder contained in the filter;
- introducing the tool according to claim 1 into the filter;
- rotating said tool so as to pick up said excess of powdered material and transfer at least most of said excess of powdered material picked up towards said storage reservoir.

13. The method according to claim 12, further comprising the step of:
- performing a first joint rotation of said first blade and said second blade around a central vertical axis of said tool so that said first blade picks up said excess of powdered material and transfers at least most of said excess of powdered material picked up towards said storage reservoir, and
- performing a second rotation singly of said second blade around said central vertical axis in a rotation direction opposite the previous direction so that said second blade transfers to said storage reservoir any residual part of said excess of powdered material which said first blade has picked up but not transferred to said storage reservoir.

* * * * *